US007764470B2

(12) United States Patent
Mizuno et al.

(10) Patent No.: US 7,764,470 B2
(45) Date of Patent: Jul. 27, 2010

(54) MAGNETO-RESISTANCE EFFECT ELEMENT AND THIN-FILM MAGNETIC HEAD HAVING NON-MAGNETIC SPACER LAYER COMPOSED OF ONE SEMICONDUCTOR LAYER AND TWO METAL LAYERS (75) Inventors: Tomohito Mizuno, Tokyo (JP); Kei Hirata, Tokyo (JP); Yoshihiro Tsuchiya, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 649 days.

(21) Appl. No.: 11/682,421

(22) Filed: Mar. 6, 2007

(65) Prior Publication Data
US 2008/0218907 A1 Sep. 11, 2008

(51) Int. Cl.
*G11B 5/33* (2006.01)
(52) U.S. Cl. ................... 360/324.1; 360/324; 360/324.2
(58) Field of Classification Search ............... 360/324, 360/324.1–324.2
See application file for complete search history.

(56) References Cited
U.S. PATENT DOCUMENTS
2002/0048128 A1* 4/2002 Kamiguchi et al. ...... 360/324.1

2003/0011945 A1* 1/2003 Yuasa et al. ............... 360/324.1
2004/0021990 A1* 2/2004 Koui et al. ................ 360/324.1
2004/0057162 A1* 3/2004 Gill ........................... 360/314
2004/0075956 A1* 4/2004 Tetsukawa et al. ....... 360/324.1
2006/0067011 A1* 3/2006 Soda et al. ................ 360/324.1

FOREIGN PATENT DOCUMENTS
JP 2003-8102 A 1/2003
JP 2006-99872 A 4/2006

* cited by examiner

*Primary Examiner*—William J Klimowicz
*Assistant Examiner*—Carlos E Garcia
(74) *Attorney, Agent, or Firm*—Knobbe Martens Olson & Bear LLP (57) ABSTRACT A magneto-resistance effect element used for a thin film magnetic head is configured by a buffer layer, an anti-ferromagnetic layer, a pinned layer, a spacer layer, a free layer, and a cap layer, which are laminated in this order, and a sense current flows through the element in a direction orthogonal to the layer surface, via a lower shield layer and a upper shield layer. The pinned layer comprises an outer layer in which a magnetization direction is fixed, a non-magnetic intermediate layer, and an inner layer which is a ferromagnetic layer. The spacer layer comprises a first and second non-magnetic metal layer, and a semiconductor layer. The first and second non-magnetic metal layer and comprise CuPt films having a thickness of more than 0 nm but no more than 2.0 nm, and the Pt content ranges from a minimum of 5 to a maximum of 25 at %.

7 Claims, 9 Drawing Sheets

MAGNETO-RESISTANCE EFFECT ELEMENT AND THIN-FILM MAGNETIC HEAD HAVING NON-MAGNETIC SPACER LAYER COMPOSED OF ONE SEMICONDUCTOR LAYER AND TWO METAL LAYERS

BACKGROUND OF THE INVENTION

1. Field of the Invention

The present invention relates to a magneto-resistance effect element and a thin-film magnetic head.

2. Description of the Related Art

Magnetic disk drives employ a thin-film magnetic head having a magneto-resistance effect element (MR element) for reading magnetic signals. In recent years, efforts have been made to design magnetic disk drives for higher recording densities, and accordingly there are growing demands for thin-film magnetic heads, particularly magneto-resistance effect elements, which satisfy higher-sensitivity and higher-output requirements.

A CIP-GMR (Current in Plane-Giant Magneto-resistance) element which is a giant magneto-resistance effect element having a nonmagnetic layer between ferromagnetic layers and passing a sensing current in parallel to a layer surface, has been conventionally developed as a reproducing element in a thin-film magnetic head. On the other hand, a magnetic head that uses a TMR (Tunnel Magneto-resistance) element which has an insulation layer instead of the nonmagnetic layer as an intermediate layer and which passes a sensing current perpendicular to a layer surface, has also been developed in order to achieve higher densification. Furthermore, a magnetic head that uses a CPP (Current Perpendicular to Plane)-GMR element which is a GMR element having a nonmagnetic layer as the intermediate layer and passing a sensing current perpendicular to the layer surface similar to the TMR element, has also been developed. CPP-GMR element has an advantage of having low resistance in comparison with the TMR element and having higher output in a narrower track width than the CIP-GMR element.

An ordinary GMR element is in the cylindrical shape of a desired size, and has a structure interposing a non-magnetic spacer layer between a pinned layer which is a ferromagnetic layer in which the magnetization direction is fixed a and a free layer which is a ferromagnetic layer in which the magnetization direction varies according to an external magnetic field. Such a GMR element is also referred to as a spin valve film (SV film). The upper and lower ends of the GMR element are provided with a cap layer and a buffer layer, respectively. The cap layer, the GMR element, and the buffer layer are interposed between the upper shield layer and the lower shield layer. In the case of the CPP-GMR element, the upper shield layer and the lower shield layer function as an electrode, respectively, and a sense current flows in a direction orthogonal to the layer surface.

The spacer layer of a conventional CPP-GMR element has been most commonly comprised of Cu that is about 3.0 nm in thickness. However, in the CPP-GMR element having a spacer layer comprising Cu, since Cu has a low resistance, the sheet resistance (RA value) is low, and, for example, it is 0.07 $\Omega \cdot \mu m^2$, and the MR ratio is also low, and it is below about 4%. In this CPP-GMR element, to obtain a sufficient output voltage, it has been necessary to operate the element at a high current density. When the element is operated at the high current density, an electro-migration phenomenon occurs in which a metallic atom colliding with an electron migrates, and there is a fear that the magneto-resistance effect element will be destroyed by the migration of the atom and its life span becomes extremely short. Further, when the element is operated at the high current density, an output noise caused by a spin transfer torque occurs, and a practical problem arises.

To increase the RA value of the CPP-GMR element, a confined-current-path type magneto-resistance effect element a has been proposed, in which a non-current portion is provided inside the spacer layer and the current is allowed to flow in a direction vertical to the layer surface by passing through only certain portions inside the spacer layer. In the confined-current-path type magneto-resistance effect element, the resistance of the spacer layer can be substantially high, thereby the RA value can be high. However, such a confined-current-path type magneto-resistance effect element has been difficult to manufacture, and it was extremely difficult to form the element at a high dimensional accuracy so as to be able to obtain desired performance.

Hence, as a method for making the RA value of the CPP-GMR element high by a technique other than confining the current path, an example described below is available.

Japanese Patent Laid-Open No. 2006-99872 proposes a magneto-resistance effect element, in which the spacer layer is of a three layer structure comprising a first boundary surface layer, an electrically conductive layer, and a second boundary surface layer. The first and second boundary surface layers comprise CuAu, CuPd, CuPt, CuRu, CuNi, or CuPh, and the electrically conductive layer comprises Au, Pt, Ni, Pd, Cr, CuPd, CuPt, CuNi, or CuCr.

Japanese Patent Laid-Open No. 2003-8102 proposes a magneto-resistance effect element provided with a resistance adjusting layer adjacent to the spacer layer, in which the number of electrically conductive carriers is equal to or below $10^{22}$ coulomb/$cm^3$. The spacer layer comprises Cu, Au, Ag, Ru, Ir, Pd, Cr, Mg, Al, Rh, Pt, or the like. The resistance adjusting layer comprises a semiconductor or a half metal, and is based on graphite, As, Sb, Bi, HgTe, HgSe, CoSi, $(Co_{1-x}, Fe_x)Si$, $(Co_{x-1}, Ni_x)Si$, $(Co_{x-1}, Mn_x)Si$, $(Co_{x-1}, Cr_x)Si$, FeS, C, Si, Ge, AlN, GaN, InN, AlP, AlAs, AlSb, GaP, GaAs, GaSb, InP, InAs, InSb, ZnO, β-ZnS, ZnSe, ZnTe, CdS, CdTe, HgTe, α-SiC, β-SiC, PbS, PbSe, PbTe, SnTe, $CuInSe_2$, $FeSi_{2.43}$, $β-FeSi_2$, $MnSi_{1.72}$, $CrSi_2$, $(Cr_{1-x}Mn_x)Si_2$, $Mg_2Si$, $BaSi_2$, $ReSi_{1.75}$, $RuSi_3$, $OsSi_2$, or $Ir_3Si_5$.

According to the above described two Patent Documents, a structure is disclosed in which the spacer layer is substantially made into a multi-layer structure, thereby attempting to improve the MR ratio to some degree as compared with the spacer layer having a Cu single layer. In these Patent Documents, although the matter that is used as the material for each layer is illustrated, it is just a listing of the different kinds of matter, and there is no comparison or study of the individual matter. That is, a specific proposal for the most appropriate material to improve the MR ratio is not submitted.

SUMMARY OF THE INVENTION

An object of the present invention is to provide a magneto-resistance effect element comprising the most appropriate material and a structure to obtain a higher MR ratio and a thin film magnetic head including the same.

A magneto-resistance effect element of this invention comprises:

a pinned layer having a fixed magnetization direction;

a free layer having a magnetization direction variable depending on an external magnetic field;

a non-magnetic spacer layer provided between the pinned layer and the free layer, the spacer layer including first and second non-magnetic metal layers which comprise CuPt and a semiconductor layer which is disposed between the first and second non-magnetic metal layers.

According to this structure, since a semiconductor layer is provided in the spacer layer, resistance can be made large without lowering the MR ratio, and with a low current density, a large output voltage can be obtained. Further, since the diffusion of Cu in the spacer layer into the semiconductor layer is suppressed by Pt, a larger MR ratio can be obtained.

Incidentally, the semiconductor that makes up this semiconductor layer is a material having a band gap in which the energy difference between a valence band and a conduction band is 0.4 eV to 4.0 eV The semiconductor layer may comprise ZnO, ZnS, or GaN.

When the semiconductor layer has a thickness ranging from a minimum of 1.0 nm to a maximum of 2.5 nm, an appropriate RA value can be obtained so that the spin transfer torque becomes small and electric noise becomes small.

When CuPt that makes up the first and second non-magnetic metal layers has a thickness ranging from a minimum of 1.0 nm to a maximum of 2.0 nm, the MR ratio that is higher than before can be obtained.

When CuPt that makes up the first and second non-magnetic metal layers contains Pt ranging from a minimum of 5 at % to a maximum of 25 at %, the effect of suppressing the diffusion of Cu into the semiconductor layer is large due to the crystal structure.

The above and other objects, features, and advantages of the present invention will become apparent from the following description with reference to the accompanying drawings which illustrate embodiments of the present invention.

DETAILED DESCRIPTION OF THE PREFERRED EMBODIMENTS

Embodiments of the present invention will be described below with reference to the drawings.

[Configuration of Thin-Film Magnetic Head]

Figure 1:
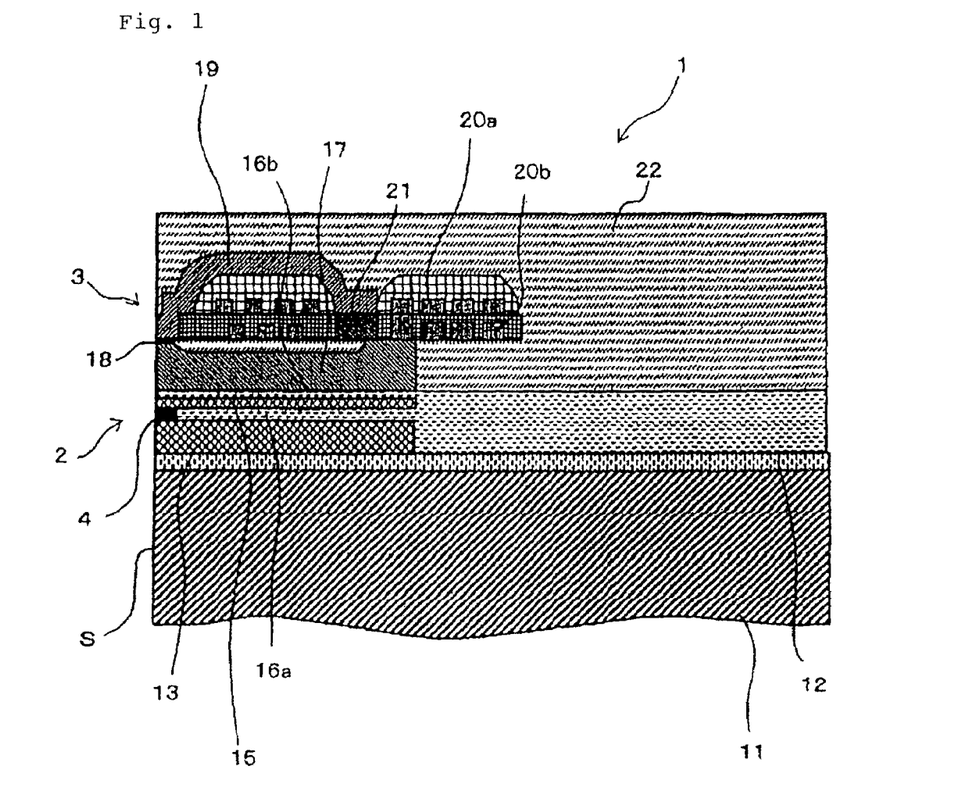
FIG. 1 is a cross-sectional view of main components of a thin film magnetic head according to an embodiment of the present invention.

FIG. 1 conceptually shows a cross-sectional view of a major portion of a thin-film magnetic head having a magneto-resistance effect element according to the present invention.

Thin-film magnetic head 1 according to the present embodiment has substrate 11, reproducing unit 2 which reads data from a recording medium (not shown) and which is formed on substrate 11, and recording unit 3 for writing data on a recording medium (not shown) and which is formed on substrate 11.

Substrate 11 is made of $Al_2O_3 \cdot TiC$ (AlTiC) that has excellent wear resistance. Base layer 12 made of alumina is disposed on an upper surface of substrate 11, and reproducing unit 2 and recording unit 3 are stacked on base layer 12.

Lower shield layer 13 made of a magnetic material such as Permalloy (NiFe), for example, is disposed on base layer 12. CPP-GMR element 4 which is a magneto-resistance effect element (hereinafter, simply referred to as "MR element") is disposed on lower shield layer 13 at an end thereof near surface S to face a recording medium and has an end exposed on surface S to face a recording medium. First upper shield layer 15 made of a magnetic material such as Permalloy, for example, is disposed on MR element 4. Lower shield layer 13, MR element 4, and first upper shield layer 15 jointly make up reproducing unit 2. Insulating layer 16a is primarily disposed in a region between lower shield layer 13 and first upper shield layer 15 which is free of MR element 4. MR element 4 is also referred to as an SV film (spin valve film).

Lower magnetic pole layer 17 made of a magnetic material such as Permalloy or CoNiFe is disposed on first upper shield layer 15 with insulating layer 16b interposed therebetween.

Lower magnetic pole layer 17 functions as a lower magnetic pole layer of recording unit 3 and also as a second upper shield layer of MR element 4.

Upper magnetic pole layer 19 is disposed on lower magnetic pole layer 17 which functions as a second upper shield layer, with recording gap layer 18 interposed therebetween, which is made of a nonmagnetic material such as Ru or alumina. Recording gap layer 18 is disposed on lower magnetic pole layer 17 at an end thereof near surface S to face a recording medium and has an end exposed on surface S to face a recording medium. Upper magnetic pole layer 19 is made of a magnetic material such as Permalloy or CoNiFe. Lower magnetic pole layer (second upper shield layer) 17 and upper magnetic pole layer 19 are magnetically connected to each other by connector 21, and they make up a magnetic circuit as a whole.

Coils 20a, 20b made of an electrically conductive material such as copper are disposed as two layers between lower magnetic pole layer 17 and upper magnetic pole layer 19 and also between surface S to face a recording medium and connector 21. Each of coils 20a, 20b serves to supply magnetic fluxes to lower magnetic pole layer 17 and upper magnetic pole layer 19 and has a planar spiral shape surrounding connector 21. Coils 20a, 20b are insulated from the surrounding region by an insulating layer. Though coils 20a, 20b in the two layers are illustrated in this embodiment, they are not limited to the two layers, but may be in one layer or three or more layers.

Overcoat layer 22 is disposed in covering relation to upper magnetic pole layer 19, and protects the structure described above. Overcoat layer 22 is made of an insulating material such as alumina, for example.

[Configuration of MR Element]

Figure 2:
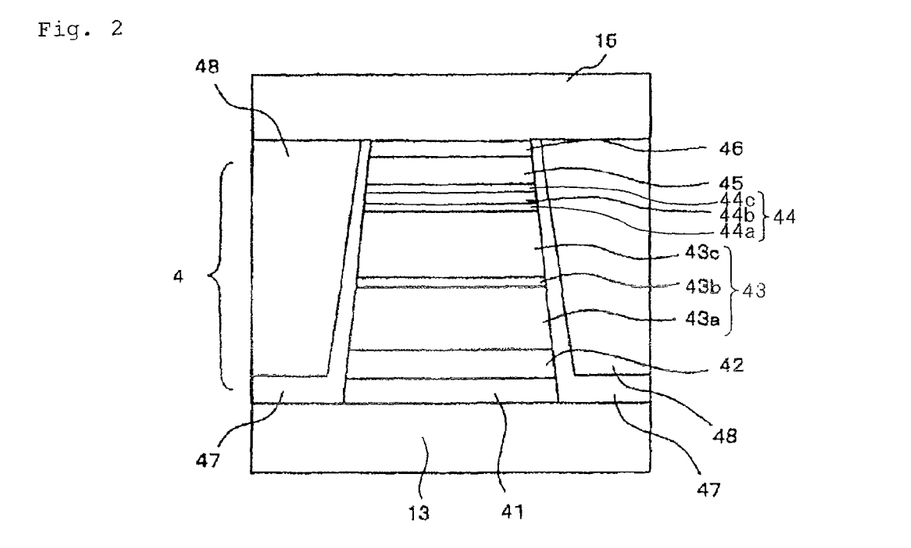
FIG. 2 is a view of a MR element shown in FIG. 1 seen from a surface to face a recording medium.

Next, MR element 4 (SV film) will be described in detail below with reference to FIG. 2, which is a view of MR element 4 shown in FIG. 1 as viewed from surface S to face a recording medium.

As described above, MR element 4 is interposed between lower shield layer 13 and upper shield layer 15. MR element 4 has a structure comprising buffer layer 41, antiferromagnetic layer 42, pinned layer 43, spacer layer 44, free layer 45, and cap layer 46 which are stacked successively in this order from the side of lower shield layer 13. In the embodiment shown in FIG. 2, Pinned layer 43 is of a structure wherein nonmagnetic intermediate layer 43b is interposed between outer layer 43a and inner layer 43c each made of a ferromagnetic material. Pinned layer 43 having such a structure is referred to as a synthetic pinned layer. Outer layer 43a is held in contact with antiferromagnetic layer 42, and inner layer 43c is held in contact with spacer layer 44. One example of materials and thicknesses of the respective layers is shown in Table 1.

TABLE 1

| | | material | thickness(nm) |
|---|---|---|---|
| | Cap layer | Ru | 10 |
| | Free layer | CoFe/NiFe/CoFe/Cu/CoFe/NiFe/CoFe | 1/2/0.5/0.2/0.5/2/1 |
| spacer layer | Nonmagnetic metal layer | CuPt | 0.2~2 |
| | Semiconductor layer | ZnO or ZnS or GaN | 1~2.5 |
| | Nonmagnetic metal layer | CuPt | 0.2~2 |

TABLE 1-continued

| | | material | thickness(nm) |
|---|---|---|---|
| pinned layer | inner layer | CoFe/Cu/CoFe/Cu/CoFe | 1/0.2/1.3/0.2/1.3 |
| | Nonmagnetic intermediate layer | Ru | 0.4 or 0.8 |
| | outer layer | CoFe | 3.7 |
| Antiferromagnetic layer | | IrMn | 7 |
| Buffer layer | | Ta/NiCr | 1/5 |

Lower shield layer 13 and upper shield layer 15 serve as electrodes, respectively. A sense current flows in a direction orthogonal to the layer surface through lower shield layer 13 and upper shield layer 15 of MR element 4. Lower shield layer 13 and upper shield layer 15 comprise NiFe films having a thickness of about 2 μm or less.

A combination of materials in which exchange coupling between anti-ferromagnetic layer 42 and outer layer 43a of pinned layer 43 becomes favorable is selected as a material of buffer layer 41, and buffer layer 41 comprises a laminated layer such as Ta/NiCr. Incidentally, in the present specification, "/" showing a multi-layer structure means that the layer of the left side of "/" is a layer lower than the layer of the right side, that is, a layer formed earlier.

Anti-ferromagnetic layer 42 plays a role of fixing the magnetization direction of pinned layer 43, and for example, comprises a film such as IrMn film that has a thickness of 7.0 nm.

Pinned layer 43 is formed as a magnetic layer, and as described above, has a structure laminated with outer layer 43a, non-magnetic intermediate layer 43b, and inner layer 43c in this order. Outer layer 43a is fixed in the magnetization direction for the external magnetic field by anti-ferromagnetic layer 42, and for example, comprises a 70CoFe film having a thickness of 3.7 nm. Non-magnetic intermediate layer 43b comprises, for example, a Ru film having a thickness of 0.4 to 0.8 nm. Inner layer 43c is ferromagnetic layer, and though not illustrated in detail, for example, has a construction comprising 90CoFe (1.0 nm)/Cu (0.2 nm)/30CoFe (1.3 nm)/Cu (0.2 nm)/30CoFe (1.3 nm). Incidentally, each film thickness is described inside the parentheses. In such a synthetic pinned layer, the magnetic moments of outer layer 43a and inner layer 43c are mutually negated, and a magnetic field leak as a whole is suppressed, and at the same time, the magnetization direction of inner layer 43c is firmly fixed.

Spacer layer 44 of the present embodiment is made of a three-layer structure comprising first non-magnetic metal layer 44a, semiconductor layer 44b, and second non-magnetic metal layer 44c. First non-magnetic metal layer 44a and second non-magnetic metal layer 44c comprise a CuPt film that has a thickness ranging from a minimum of 0.2 nm to a maximum of 2.0 nm, and the Pt content is ranging from a minimum of 5 at % to a maximum of 25 at %. Semiconductor layer 44b comprises a ZnO film, ZnS film, or GaN film having thickness ranging from a minimum of 1.0 nm to a maximum of 2.5 nm. The operation effect of this spacer layer 44 will be described later.

Free layer 45 changes in the magnetization direction according to the external magnetic field. Free layer 45 of the present embodiment, though not illustrated in detail, has a construction comprising 70CoFe (1.0 nm)/80NiFe(2.0 nm)/70CoFe(0.5 nm)/Cu(0.2 nm)/70CoFe(0.5 nm)/80NiFe(2.0 nm)/70CoFe(1.0 nm).

Cap layer 46 is provided to prevent deterioration of MR element 4, and is made of Ru having a thickness of 10.0 nm, for example.

Hard bias films 48 are disposed on opposite sides (right and left sides in FIG. 2) of MR element 4 in a track width direction (an in-plane direction of each of the layers of MR element 4 within a plane parallel to surface S to face a recording medium), with insulating films 47 interposed therebetween. Hard bias films 48 apply a biasing magnetic field in the track width direction to free layer 45 to turn free layer 45 into a single magnetic domain. Hard bias films 48 are made of a hard magnetic material such as CoPt, CoCrPt, or the like, for example. Insulating films 47 serve to prevent the sensing current from leaking into hard bias films 48, and may be in the form of an oxide film of $Al_2O_3$, for example. Insulating films 47 may be a part of insulating layer 16a.

[Configuration of Spacer Layer and Operation Effect]

Here, spacer layer 44 which is the most characteristic configuration in the present embodiment will be described.

Figure 3:
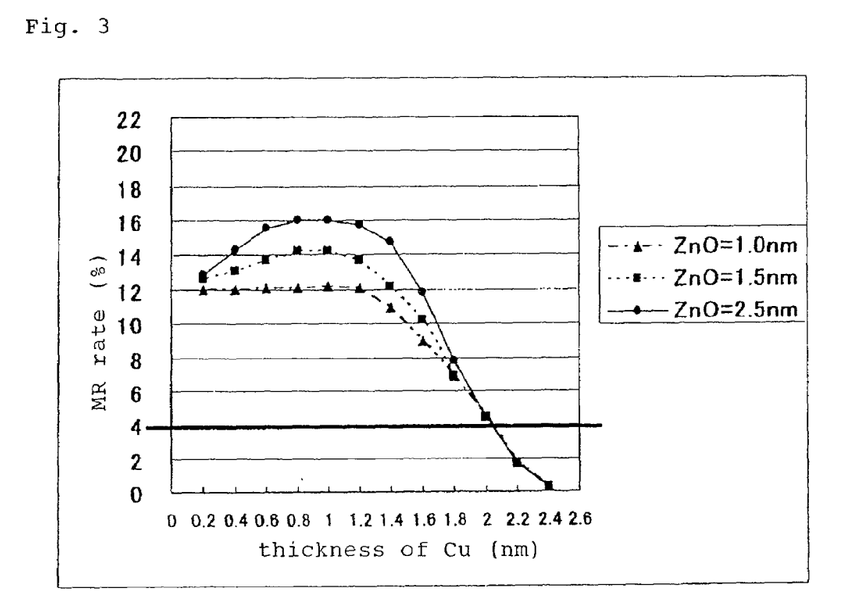
FIG. 3 is a graph showing a relationship between the thickness of Cu and a MR ratio when ZnO is used as the semiconductor layer in the spacer layer and Cu is used as the first and second non-magnetic metal layers in the MR element shown in FIG. 1.

First, describing the circumstances that led to invention of the present application, the inventor of the present application, similarly to Japanese Patent Laid-Open No. 2006-99872 and Japanese Patent Laid-Open No. 2003-8102, has attempted to improve the MR ratio by making spacer layer 44 into a multiple-layer structure instead of a single layer structure of Cu, and found that it is particularly effective to form spacer layer 44 having a structure interposing semiconductor layer 44b between first non-magnetic metal layer 44a and second non-magnetic metal layer 44c. Specifically, as the material of first non-magnetic metal layer 44a and second non-magnetic metal layer 44c, Cu, which was the material of the conventional spacer layer of the single layer, has been used, and ZnO has been used as the material of semiconductor layer 44b (this configuration is referred to as "reference example" for the sake of convenience). Then, the MR ratio of this magneto-resistance effect element having spacer layer 44 comprising Cu/ZnO/Cu has been determined. FIG. 3 shows a relationship between the thickness of first non-magnetic metal layer 44a and second non-magnetic metal layer 44c comprising Cu and the MR ratio when the thickness of semiconductor layer 44b comprising ZnO is 1.0 nm, 1.5 nm or 2.5 nm.

Here, considering the fact that the MR ratio of the conventional magneto-resistance effect element 2, which has the spacer layer made of a Cu single layer having a thickness of about 2.8 nm to 3.0 nm, was 4%, in the reference example, an excellent MR ratio can be obtained in which the thickness of first non-magnetic metal layer 44a and second non-magnetic metal layer 44c is in the range of 2.0 nm or less. When the thickness of semiconductor layer 44b is 1.0 nm, an MR ratio having a maximum of 12.2% is obtained. When the thickness of the semiconductor layer 44b is 1.5 nm, an MR ratio having a maximum of 14.2% is obtained. When the thickness of the semiconductor layer 44b is 2.5 nm, an MR ratio having a maximum of 16.0% is obtained. This is because information on the spin direction from pinned layer 43 is considered capable of being transferred to free layer 45 without suffering damage since spacer layer 44 contains semiconductor layer 44b. Further, since spacer layer 44 contains semiconductor layer 44b, the resistance value is large, and therefore, a large output voltage can be obtained with a low current density.

Although the configuration of the reference example has an excellent effect, there is a growing demand that the MR ratio be increased as much as possible, in recent years. Consequently, the applicant of the present application has continued to carry out his research in order to create configuration capable of obtaining a higher MR ratio than the result shown in FIG. 3. As a result, applicant has found that, as the material of first non-magnetic metal layer 44a and second non-magnetic metal layer 44c, the use of CuPt in place of Cu is effective. Thus, the invention of the present application has been completed.

Figure 4:
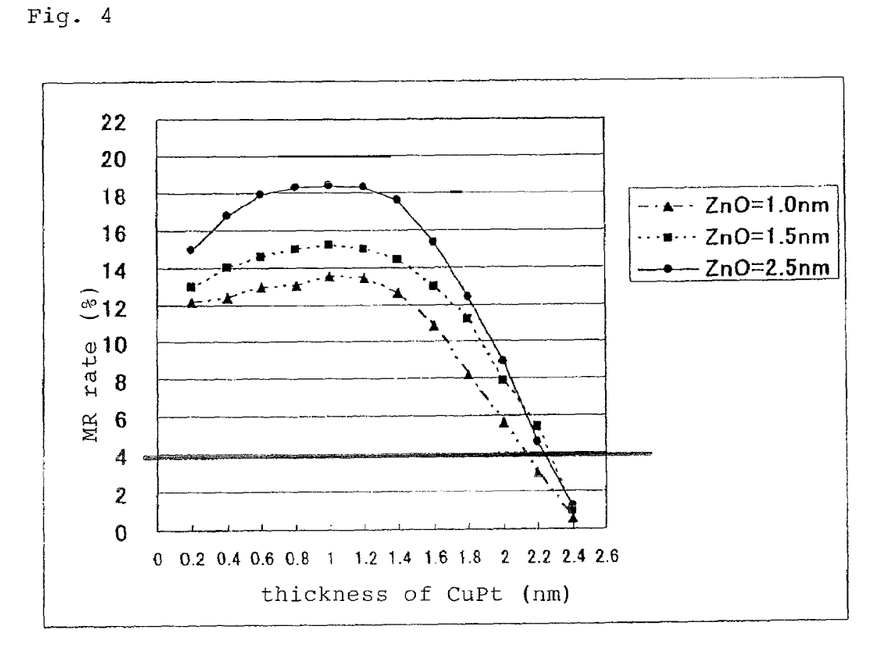
FIG. 4 is a graph showing a relationship between the thickness of CuPt and a MR ratio when ZnO is used as the semiconductor layer in the spacer layer and CuPt is used as the first and second non-magnetic metal layers in the MR element shown in FIG. 1.

FIG. 4 shows a relationship between the thickness of first non-magnetic metal layer 44a and second non-magnetic metal layer 44c comprising CuPt and the MR ratio when the thickness of semiconductor layer 44b comprising ZnO is 1.0 nm, 1.5 nm, or 2.5 nm. When this FIG. 4 is compared with FIG. 3, it is recognized that the MR ratio is high as a whole. That is, in the embodiment shown in FIG. 4, when the thickness of semiconductor layer 44b is 1.0 nm, an MR ratio having a maximum of 13.5% is obtained, and when the thickness of semiconductor layer 44b is 1.5 nm, an MR ratio having a maximum of about 15.2% is obtained, and when the thickness of semiconductor layer 44b is 2.5 nm, an MR ratio having a maximum of about 18.4% is obtained. The reason for this is as follows. When first non-magnetic metal layer 44a and second non-magnetic metal layer 44c are Cu, this Cu gradually diffuses into ZnO of semiconductor layer 44b. ZnO in which Cu is diffused loses its property as a semiconductor and its function for transferring information on the spin direction without being harmed. In contrast to this, when first non-magnetic metal layer 44a and second non-magnetic layer 44c are CuPt, since the diffusion of Cu is prevented by Pt, there is not much diffusion of Cu into ZnO of semiconductor layer 44b. Consequently, the property of ZnO as a semiconductor is maintained, the information on the spin direction can be transferred without being harmed, so that the MR ratio is improved.

Incidentally, when the thickness of first non-magnetic metal layer 44a and second non-magnetic metal layer 44c comprising CuPt becomes larger than about 1.4 nm, the MR ratio is lowered, and when the thickness is about 2.2 nm or less, the MR ratio is lowered by as much as 4%. The reason for this is due to the fact that the thickness of first non-magnetic metal layer 44a and second non-magnetic metal layer 44c comprising CuPt becomes too thick so that the distance between free layer 45 and pinned layer 43 becomes too large.

When the thickness of first non-magnetic metal layer 44a and second non-magnetic metal layer 44c comprising CuPt is 0 nm, that is, when first non-magnetic metal layer 44a and second non-magnetic metal layer 44c do not exist, a variety of matters (for example, Co) diffuses into ZnO of semiconductor layer 44b from other layers, and harms its property as a semiconductor. As shown in FIG. 4, though only on the magneto-resistance effect element, in which the thickness of first non-magnetic metal layer 44a and second non-magnetic metal layer 44c comprising CuPt is 0.2 nm or more, experiments are conducted to demonstrate the effect, a certain degree of effect is considered obtainable when the thickness is larger than 0 nm.

Figure 5:
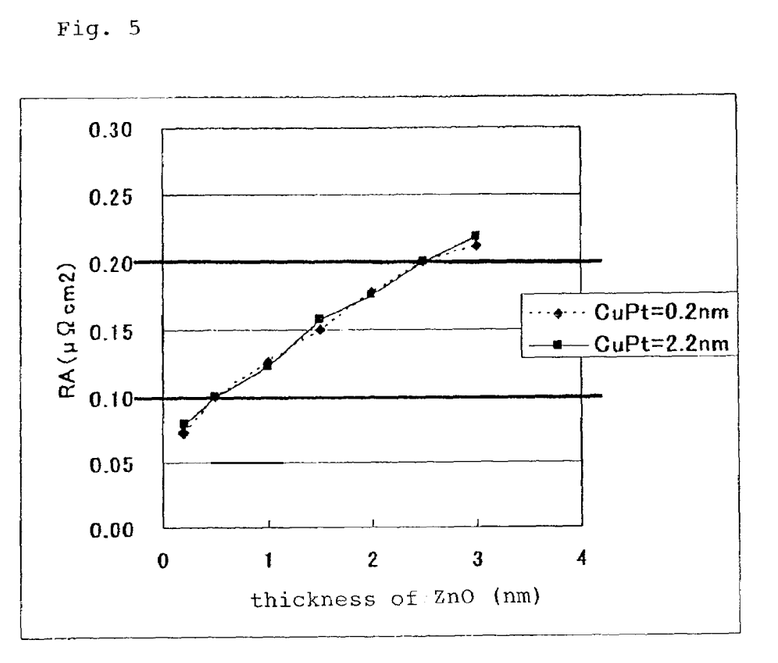
FIG. 5 is a graph showing a relationship between the thickness of ZnO and a RA value when ZnO is used as the semiconductor layer in the spacer layer and CuPt is used as the first and second non-magnetic metal layers in the MR element shown in FIG. 1.

FIG. 5 shows a relationship between the thickness of semiconductor layer 44b comprising ZnO and a sheet resistance RA value when the thickness of first non-magnetic metal layer 44a and second non-magnetic metal layer 44c comprising CuPt is 0.2 nm or 2.2 nm. In general, when the RA value is too small (for example, smaller than $0.10\ \mu\Omega\cdot cm^2$), a large current density (for example, $5\times10^{-8}\ A/cm^2$) is required to obtain a sufficient voltage change, and this makes a spin transfer torque large and causes a defects which harms waveform symmetry. Further, when the RA value is too large (for example, larger than $0.20\ \mu\Omega\cdot cm^2$), a large electric noise (shot noise) occurs due to high resistance, and causes a defect which causes the S/N ratio to deteriorate. Hence, it is recognized that spin transfer torque can be relatively small, and electric noise can be small, and favorable S/N ratio can be obtained, and the RA value can remain in the range from a minimum of 0.10 μΩ·cm² to a maximum of 0.20 μΩ·cm², when the thickness of semiconductor layer 44b comprising ZnO ranges from a minimum of 0.5 nm to a maximum of 2.5 nm. Incidentally, the thickness of first non-magnetic metal layer 44a and second non-magnetic metal layer 44c comprising CuPt hardly affects the RA value.

As described above, in the present embodiment, when the thickness of first non-magnetic metal layer 44a and second non-magnetic metal layer 44c comprising CuPt is 2.0 nm or less, and the thickness of semiconductor layer 44b comprising ZnO ranges from a minimum of 0.5 nm to a maximum of 2.5 nm, it is recognized that an excellent MR ratio and RA value can be obtained.

Next, as other embodiments of the present invention, as semiconductor layer 44b of spacer layer 44, a magneto-resistance effect element using a ZnS layer in place of a ZnO layer and a magneto-resistance effect element using a GaN layer in place of the ZnO layer were manufactured. Incidentally, a description on these embodiments will be omitted since they are the same as the above described embodiment except for semiconductor layer 44b.

Figure 6:
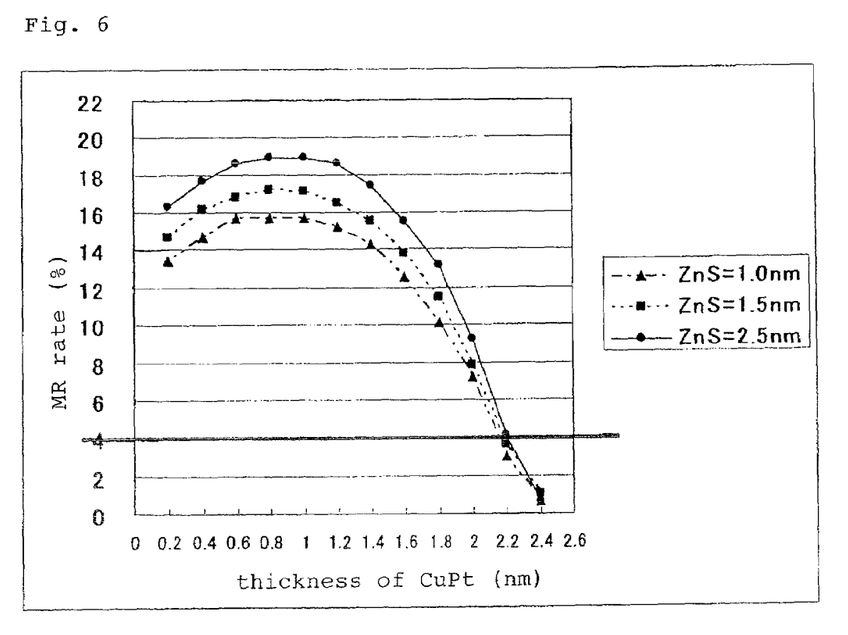
FIG. 6 is a graph showing a relationship between the thickness of CuPt and the MR ratio when ZnS is used as the semiconductor layer in the spacer layer and CuPt is used as the first and second non-magnetic metal layers in the MR element shown in FIG. 1.
Figure 7:
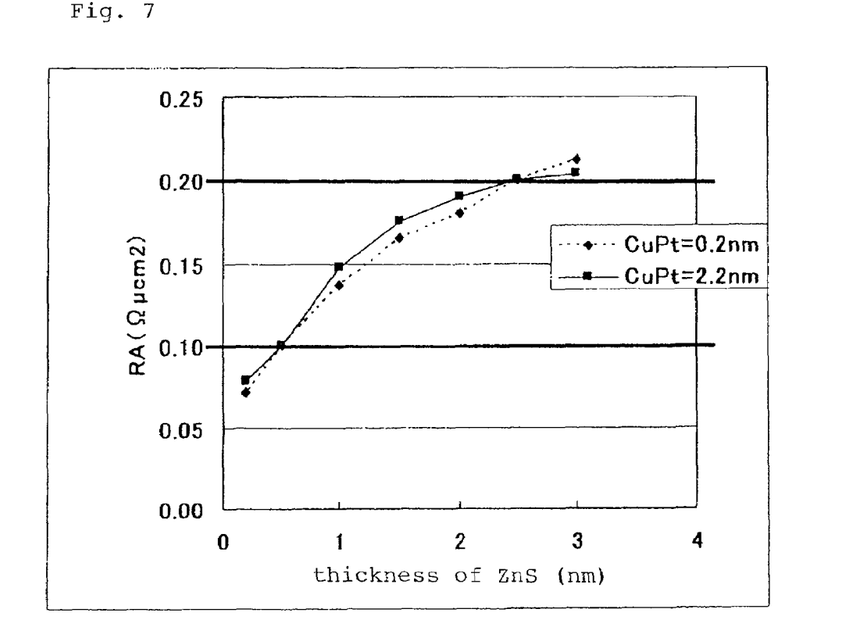
FIG. 7 is a graph showing a relationship between the thickness of ZnS and the RA value when ZnS is used as the semiconductor layer in the spacer layer and CuPt is used as the first and second non-magnetic metal layers in the MR element shown in FIG. 1.

The relationship between the thickness of first non-magnetic metal layer 44a and second non-magnetic metal layer 44c comprising CuPt of the magneto-resistance effect element having semiconductor layer 44b that comprises ZnS and the MR ratio is shown in FIG. 6, and the relationship between the thickness of semiconductor layer 44b comprising ZnS and the sheet resistance RA value is shown in FIG. 7. In the present embodiment, as shown in FIG. 6, when the thickness of semiconductor layer 44b is 1.0 nm, an MR ratio having a maximum of 15.7% is obtained, and when the thickness of the semiconductor layer 44b is 1.5 nm, an MR ratio having a maximum of about 17.2% is obtained, and when the thickness of semiconductor layer 44b is 2.5 nm, an MR ratio having a maximum of about 18.9% is obtained. Further, as shown in FIG. 7, when the thickness of semiconductor layer 44b comprising ZnS ranges from a minimum of 0.5 nm to a maximum of 2.5 nm, the RA value is in the range ranges from a minimum of 0.10 μΩ·cm² to a maximum of 0.20 μΩ·cm².

Figure 8:
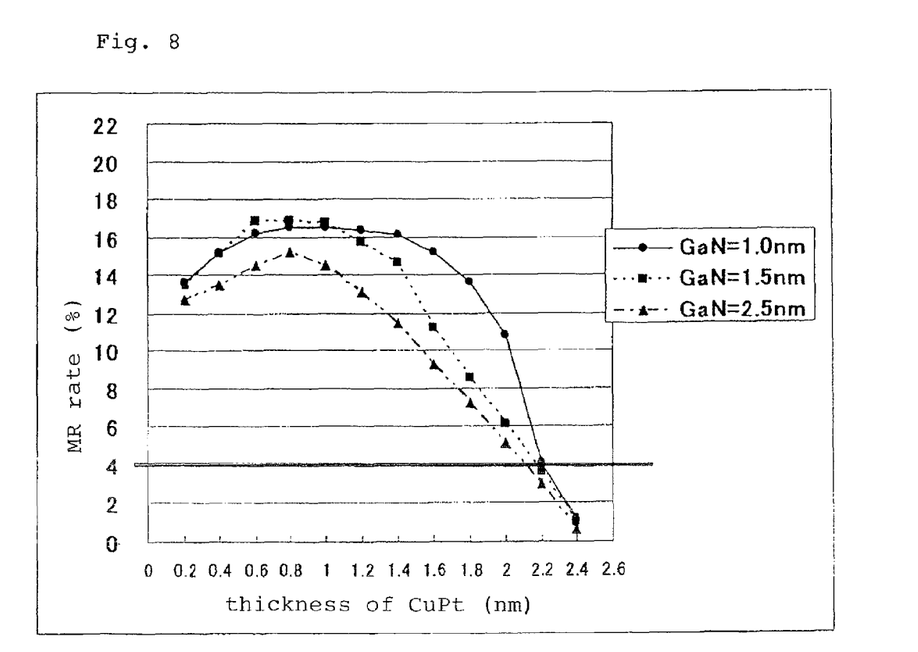
FIG. 8 is a graph showing a relationship between the thickness of CuPt and the MR ratio when GaN is used as the semiconductor layer in the spacer layer and CuPt is used as the first and second non-magnetic metal layers in the MR element shown in FIG. 1.
Figure 9:
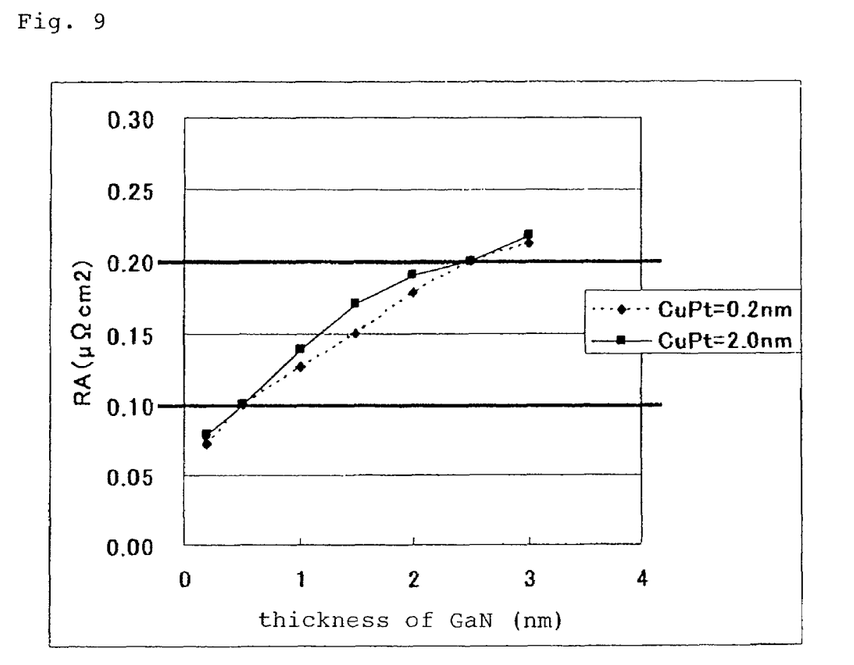
FIG. 9 is a graph showing a relationship between the thickness of GaN and the RA value when GaN is used as the semiconductor layer in the spacer layer and CuPt is used as the first and second non-magnetic metal layers in the MR element shown in FIG. 1.

The relationship between the thickness of first non-magnetic metal layer 44a and second non-magnetic metal layer 44c that comprises CuPt of the magneto-resistance effect element having semiconductor layer 44b comprising GaN and the MR ratio is shown in FIG. 8, and the relationship between the thickness of semiconductor layer 44b comprising GaN and the sheet resistance RA value is shown in FIG. 9. In the present embodiment, as shown in FIG. 8, when the thickness of semiconductor layer 44b is 1.0 nm, an MR ratio having a maximum of 15.2% is obtained, and when the thickness of the semiconductor layer 44b is 1.5 nm, an MR ratio having a maximum of about 16.8% is obtained, and when the thickness of the semiconductor layer 44b is 2.5 nm, an MR ratio having a maximum of about 16.5% is obtained. Further, as shown in FIG. 9, when the thickness of semiconductor layer 44b comprising GaN ranges from a minimum of 0.5 nm to a maximum of 2.5 nm, the RA value is in the range from a minimum of 0.10 μΩ·cm² to a maximum of 0.20 μΩ·cm².

All the experimental results shown in FIGS. 5 to 9 show approximately the same tendency. That is, the thickness of first non-magnetic metal layer 44a and second non-magnetic metal layer 44c comprising CuPt is preferably larger than 0 nm (more preferably 0.2 nm or more) and preferably 2.0 nm or less. The thickness of semiconductor layer 44b comprising ZnO, ZnS or GaN ranges preferably from a minimum of 0.5 nm to a maximum of 2.5 nm.

Figure 10:
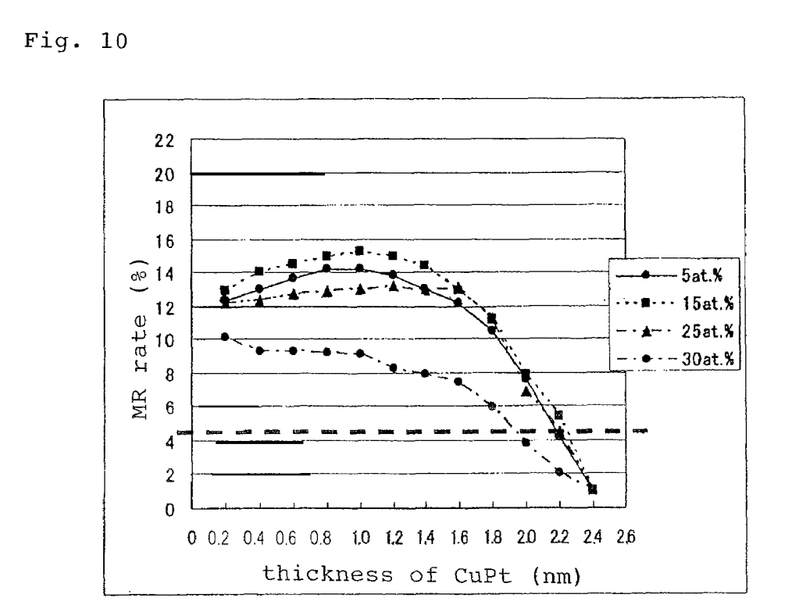
FIG. 10 is a graph showing a relationship between the thickness of CuPt and the MR ratio when ZnO is used as the semiconductor layer in the spacer layer and CuPt is used as the first and second non-magnetic metal layers and when the Pt content in CuPt is variously changed in the MR element shown in FIG. 1.

Next, the magneto-resistance effect elements in which the composition of CuPt comprised in first non-magnetic metal layer 44a and second non-magnetic metal layer 44c was changed, namely, in which the Pt content was changed, were prepared and the relationship between the thickness of CuPt and the MR ratio was determined. The result is shown in FIG. 10. Incidentally, semiconductor layers 44b of these magneto-resistance effect elements comprise ZnO having a thickness of 1.5 nm.

Figure 11:
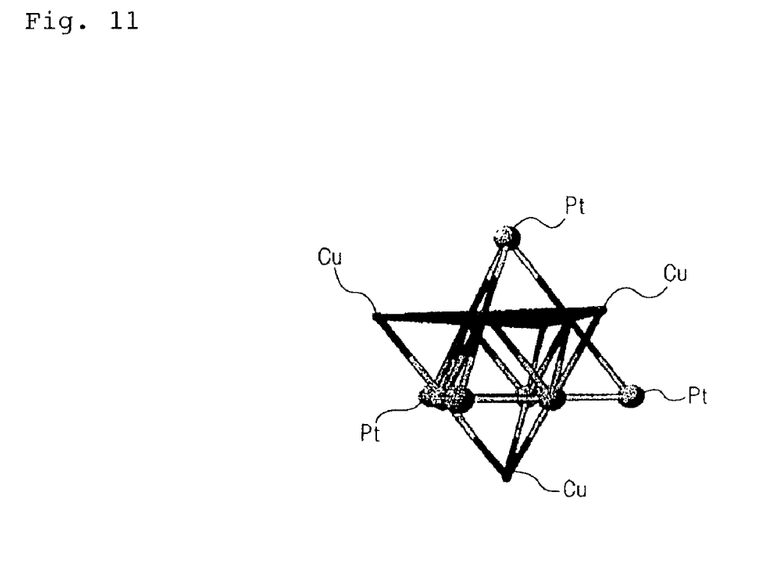
FIG. 11 is a schematic illustration schematically showing structure L11 of CuPt.
Figure 12:
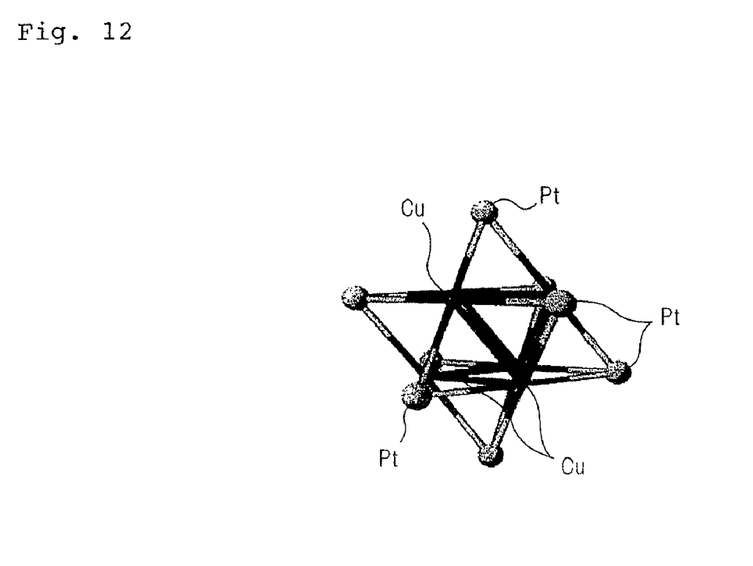
FIG. 12 is a schematic illustration schematically showing structure L12 of CuPt.

Referring to FIG. 10, while a high MR ratio is obtained as long as the Pt content in CuPt ranges from a minimum of 5 at % to a maximum of 25 at %, the MR ratio becomes relatively low when the content of Pt is 30 at %. This is because the crystal structure of CuPt is changed. That is, in the range where the Pt content is in the rage from 5 at % to 25 at %, CuPt has structure L11 as shown in FIG. 11, and when the Pt content is 30 at % or more, CuPt has structure L12 as shown in FIG. 12. In FIGS. 11 and 12, Pt is shown in a light gray color and Cu is shown in a block color. In structure L11 shown in FIG. 11, Pt and Cu are substantially separated structures, and are in the form alternately laminated with a Cu layer and a Pt layer. On the other hand, in structure L12 shown in FIG. 12, Pt and Cu are in the form that is relatively jumbled and mixed.

Here, the reason why the improved effect on the MR ratio is obtained by using CuPt as first non-magnetic metal layer 44a and second non-magnetic metal layer 44c in the present invention is because, as described above, the diffusion of Cu of first non-magnetic metal layer 44a and second non-magnetic metal layer 44c into ZnO of semiconductor layer 44b is prevented by Pt. According to this principle, when Pt and Cu are relatively jumbled and mixed similarly to structure L12 shown in FIG. 12, there is a possibility that Cu diffuses to ZnO by sneaking through space between particles of Pt. In contrast to this, in the case of structure L11 shown in FIG. 11, since the layer of Cu and the layer of Pt are alternately laminated, the migration of Cu is blocked in the layer of Pt, and a space through which Cu migrates hardly exists. Consequently, when the content of Pt is 5 at % to 25 at % so that CuPt comprised in first non-magnetic metal layer 44a and second non-magnetic metal layer 44c becomes structure L11, the MR ratio becomes particularly high.

[Head Gimbal Assembly and Hard-Disk Drive which Include Thin-Film Magnetic Head]

Figure 13:
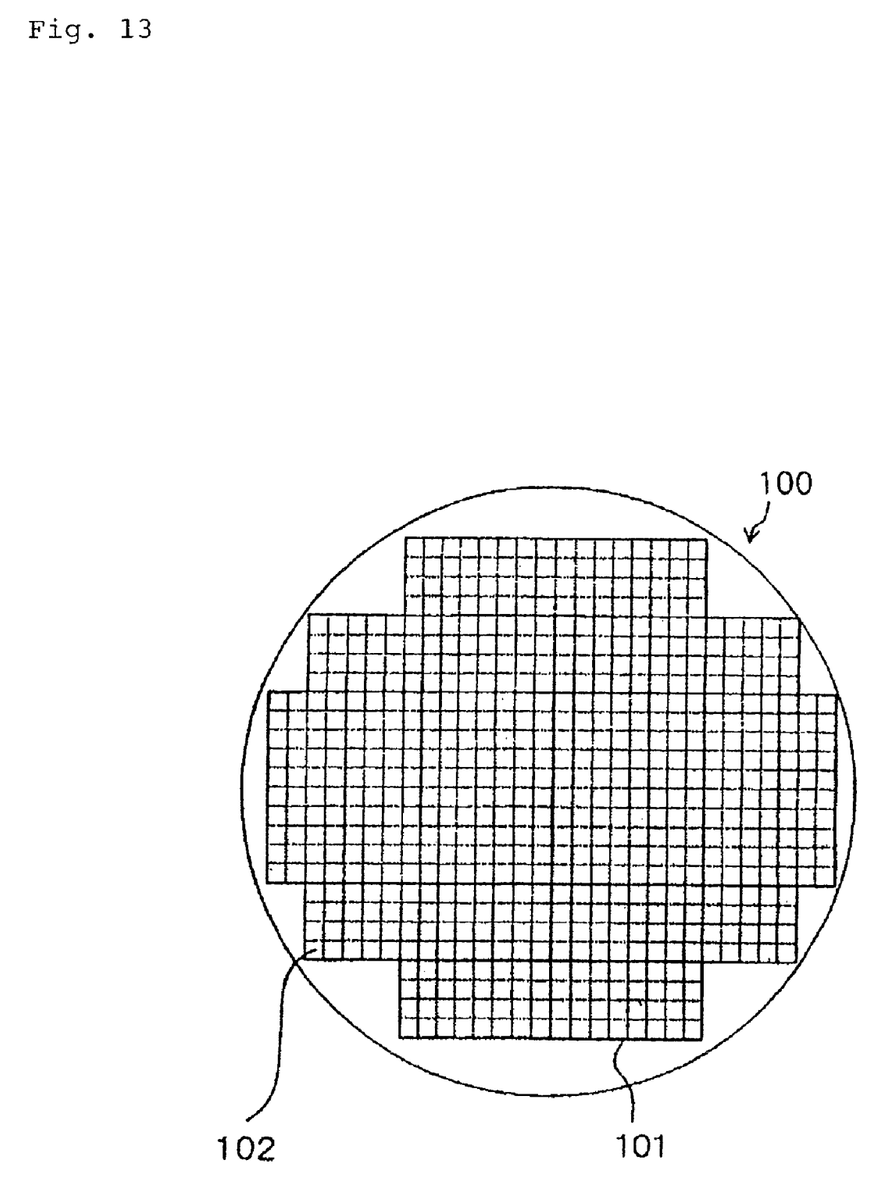
FIG. 13 is a top plan view of one example of a wafer formed with thin film magnetic heads shown in FIG. 1.

Many thin-film magnetic heads 1 according to the present invention are formed in a single wafer. FIG. 13 shows a diagrammatic plan view of the wafer having many structures (substrates) that includes the thin-film magnetic head shown in FIG. 1 thereon.

Wafer 100 is divided into a plurality of head element aggregates 101 each including a plurality of head elements 102 each serving as a working unit for polishing surface S to face a recording medium of thin-film magnetic head 1 (see FIG. 1). Dicing portions (not shown) are provided between head element aggregates 101 and also provided between head elements 102. Head element 102 is a structure (substrate) including the structure of thin-film magnetic head 1, and becomes thin-film magnetic head 1 after having been subjected to necessary processing such as polishing to form surface S to face a recording medium. The polishing process is carried out generally on a plurality of head elements 102 which has been cut out into a row.

Figure 14:
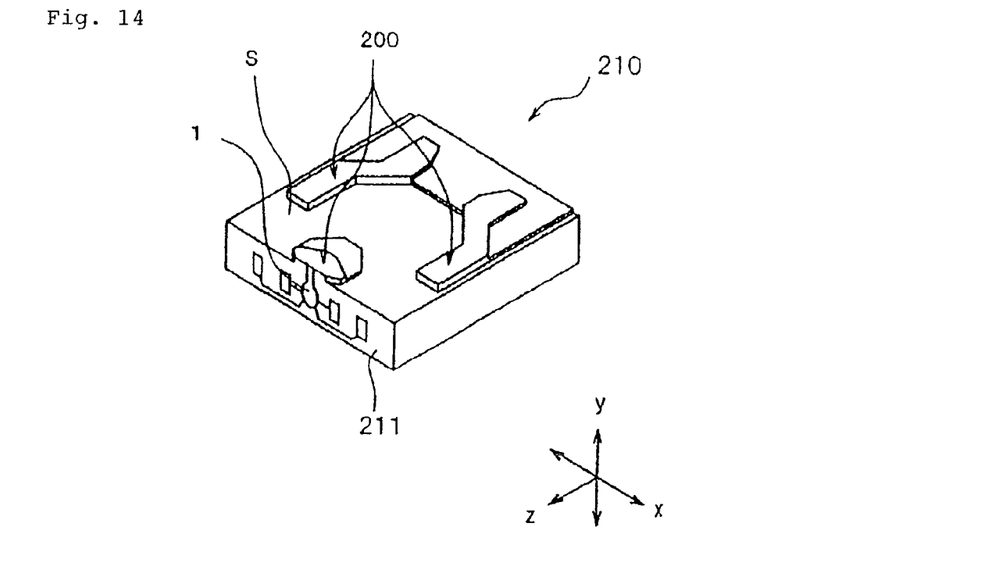
FIG. 14 is a perspective view of one example of a slider containing the thin film magnetic head shown in FIG. 1.

A head gimbal assembly and a hard disk drive having the thin-film magnetic head according to the present invention will be described below. First, slider 210 included in the head gimbal assembly will be described below with reference to FIG. 14. In the hard disk drive, slider 210 is arranged opposite to a hard disk, which is a rotationally-driven disc-shaped recording medium. Slider 210 has thin-film magnetic head 1 obtained from head element 102 (see FIG. 13). Slider 210 has a substantially hexahedral shape in which surface S to face a recording medium is formed into an air bearing surface 200 which is positioned opposite to the hard disk. When the hard disk rotates in z direction in FIG. 14, an air stream passing between the hard disk and slider 210 applies a lifting force to slider 210 downward in a y direction. Slider 210 is lifted from the surface of the hard disk by the lifting force. X directions in FIG. 11 represent a direction transverse to the tracks of the hard disk. At end surface 211 on the outlet side of the airflow of slider 210 are electrode pads to input or output signals to/from reproducing unit 2 and recording unit 3 (see FIG. 1). Surface 211 is the upper end face in FIG. 1.

Head gimbal assembly 220 will be described below with reference to FIG. 15. Head gimbal assembly 220 has slider 210 and suspension 221 by which slider 210 is resiliently supported. Suspension 221 comprises load beam 222 in the form of a leaf spring made of stainless steel, for example, flexure 223 mounted on an end of load beam 222 for giving slider 210 an appropriate degree of freedom, slider 210 being joined to flexure 223, and base plate 224 mounted on the other end of load beam 222. Base plate 224 is mounted on arm 230 of an actuator for moving slider 210 in x directions transverse to the tracks of hard disk 262. The actuator has arm 230 and a voice-coil motor for moving arm 230. A gimbal for keeping slider 210 at a constant altitude is mounted on a portion of flexure 223 where slider 210 is installed.

Head gimbal assembly 220 is mounted on arm 230 of the actuator. A structure wherein head gimbal assembly 220 is mounted on single arm 230 is referred to as a head arm assembly. A structure wherein a carriage has a plurality of arms and head gimbal assembly 220 is mounted on each of the arms is referred to as a head stack assembly.

Figure 15:
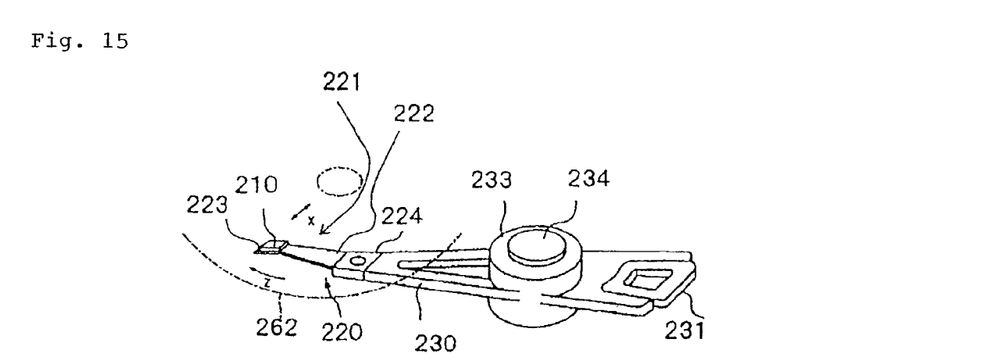
FIG. 15 is a perspective view of a head gimbal assembly including the slider shown in FIG. 14.

FIG. 15 shows a head arm assembly by way of example. In the head arm assembly, head gimbal assembly 220 is mounted on an end of arm 230. Coil 231 which is part of the voice-coil motor is mounted on the other end of arm 230. In the intermediate portion of arm 230, bearing 233 which is attached to shaft 234 for rotatably supporting arm 230 is provided.

Figure 16:
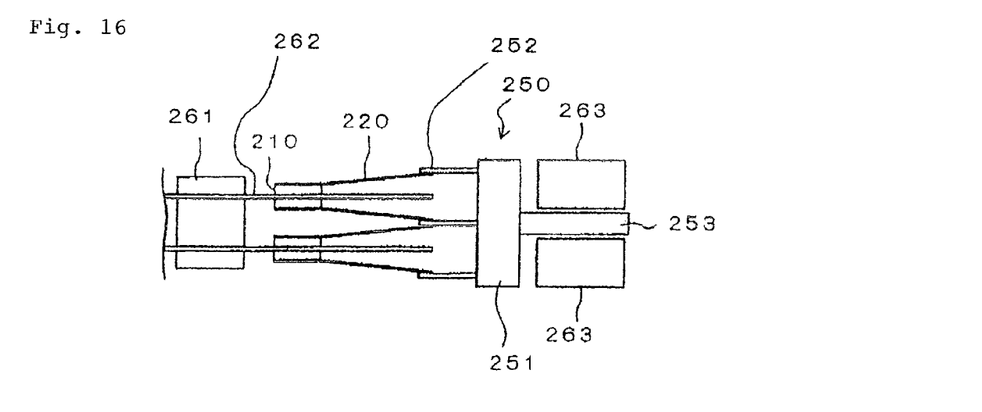
FIG. 16 is a side view of a main component of a hard disc device containing the head gimbal assembly shown in FIG. 15.
Figure 17:
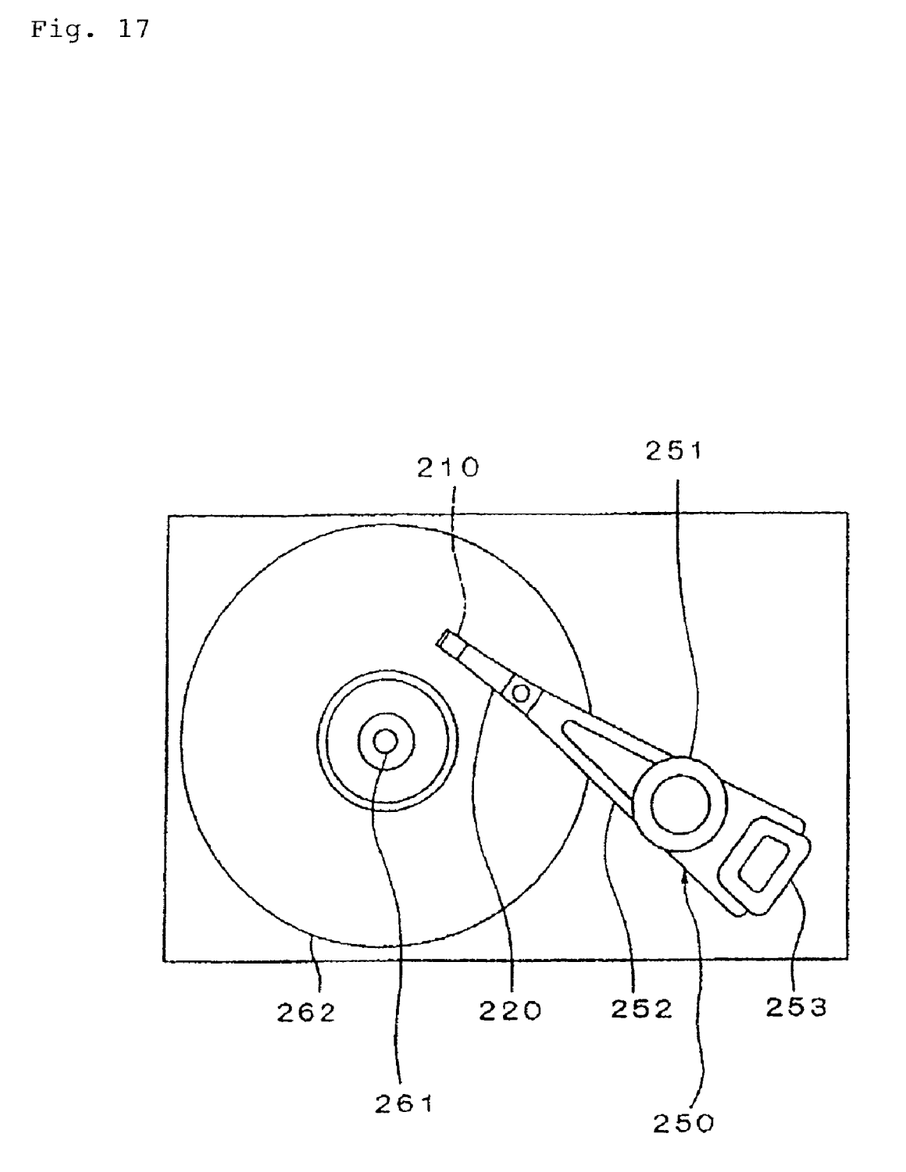
FIG. 17 is a top plan view of the hard disc device containing the head gimbal assembly shown in FIG. 15.

A head stack assembly and a hard disk drive will be described below with reference to FIGS. 16 and 17. FIG. 16 is a view showing a major portion of a hard disk drive, and FIG. 17 is a plan view of the hard disk drive. Head stack assembly 250 has carriage 251 having a plurality of arms 252. A plurality of head gimbal assemblies 220 are attached to a plurality of arms 252 such that head gimbal assemblies 220 are arranged apart from each other in the vertical direction. Coil 253, which constitutes a part of the voice-coil motor, is attached to carriage 251 on the side opposite to arms 252. Head stack assembly 250 is installed in a hard disk drive. The hard disk drive has a plurality of hard disks (magnetic recording media) 262 mounted on spindle motor 261. Two sliders 210 are arranged at positions opposite to each other interposing hard disk 262 therebetween. The voice coil motor has permanent magnets 263 which are arranged in positions opposite to each other interposing coil 253 of head stack assembly 250 therebetween.

Head stack assembly 250, except sliders 210, and the actuator support sliders 210 and position sliders 210 with respect to hard disks 262.

In the hard disk drive, the actuator moves sliders 210 in directions transverse to the tracks of hard disks 262 and position sliders 210 with respect to hard disks 262. Thin-film magnetic heads 1 included in sliders 210 record information in hard disks 262 through recording unit 3, and reproduce information recorded in hard disks 262 through reproducing unit 2.

Thin-film magnetic head 1 is not limited to the above embodiments, but may be modified in various ways. For example, though thin-film magnetic head 1 that has a structure wherein reading MR element 4 is disposed near substrate 11 and writing induction-type electromagnetic transducer is stacked on MR element 4 has been described in the above embodiments, reading MR element 4 and the writing induction-type electromagnetic transducer may be switched around. Though a thin-film magnetic head having both an MR element and an induction-type electromagnetic transducer has been described in the above embodiments, a thin-film magnetic head may have only an MR element.

Although a certain preferred embodiment of the present invention has been shown and described in detail, it should be understood that various changes and modifications may be made without departing from the spirit or scope of the appended claims.

What is claimed is:

1. A magneto-resistance effect element, comprising:
a pinned layer having a fixed magnetization direction;
a free layer having a magnetization direction variable depending on an external magnetic field;
a non-magnetic spacer layer provided between said pinned layer and said free layer, said spacer layer including first and second non-magnetic metal layers which comprise CuPt and a semiconductor layer which comprises ZnO and is disposed between said first and second non-magnetic metal layers
wherein said semiconductor layer which comprises ZnO has a thickness ranging from a minimum of 1.0 nm to a maximum of 2.5 nm,
CuPt which is included in said first and second non-magnetic metal layers has a thickness of more than 0 nm but no more than 2.0 nm, and contains Pt ranging from a minimum of 5 at % to a maximum of 25 at % so that Pt prevents Cu from diffusing toward ZnO of said semiconductor layer, in said first and second non-magnetic metal layers which comprise CuPt, and
said magneto-resistance effect element has an RA value in the range from minimum of 0.10 $\mu\Omega\cdot cm^2$ to a maximum of 0.20 $\mu\Omega\cdot cm^2$.

2. A thin film magnetic head comprising the magneto-resistance effect element according to claim 1.

3. The magneto-resistance effect element according to claim 1, wherein the semiconductor layer is constituted of a material having a band gap in which the energy difference between a valence band and a conduction band is 0.4 eV to 4.0 eV.

4. The magneto-resistance effect element according to claim 1, wherein the pinned layer is a synthetic pinned layer in which a nonmagnetic intermediate layer is interposed between an outer layer made of a ferromagnetic material and an inner layer made of a ferromagnetic material.

5. The magneto-resistance effect element according to claim 1, further comprising:
- a cap layer;
- an antiferromagnetic layer; and
- a buffer layer,
- wherein the buffer layer, the antiferromagnetic layer, the pinned layer, the spacer layer, the free layer, the cap layer are stacked in this order.

6. The magneto-resistance effect element according to claim 5, further comprising a hard bias film disposed on a side of the magneto-resistance effect element in a track width direction.

7. The magneto-resistance effect element according to claim 6, further comprising an insulating film interposed between the hard bias film and the stacked layers.

* * * * *